Inventors.
Adalbert Lohmann,
Hans Friess,
Adolf Hinze &
Heinrich Schmidt.
By. [signature] Atty.

March 20, 1962 A. LOHMANN ET AL 3,026,369

METHOD OF AND APPARATUS FOR EDITING
SINGLE-TAPE TELEVISION RECORDINGS

Filed Oct. 19, 1959 5 Sheets-Sheet 2

Inventors.
Adalbert Lohmann,
Hans Friess,
Adolf Hinze, &
Heinrich Schmidt,

By. [signature] Att'y

Inventors.
Adalbert Lohmann,
Hans Friess,
Adolf Hinze, &
Heinrich Schmidt.
By [signature] Atty.

March 20, 1962 A. LOHMANN ET AL 3,026,369

METHOD OF AND APPARATUS FOR EDITING SINGLE-TAPE TELEVISION RECORDINGS

Filed Oct. 19, 1959 5 Sheets-Sheet 4

Inventors,
Adalbert Lohmann,
Hans Friess,
Adolf Hinze, &
Heinrich Schmidt.
By [signature] Atty.

Inventors.
Adalbert Lohmann,
Hans Friess,
Adolf Hinze, &
Heinrich Schmidt.
By. Atty.

United States Patent Office 3,026,369

Patented Mar. 20, 1962

3,026,369

METHOD OF AND APPARATUS FOR EDITING SINGLE-TAPE TELEVISION RECORDINGS

Adalbert Lohmann, Karlsruhe, Hans Friess, Karlsruhe-Daxlanden, Adolf Hinze, Karlsruhe West, and Heinrich Schmidt, Karlsruhe, Germany, assignors to Siemens & Halske Aktiengesellschaft Berlin and Munich, a corporation of Germany Filed Oct. 19, 1959, Ser. No. 847,140
Claims priority, application Germany Feb. 20, 1959
21 Claims. (Cl. 178—5.8)

This invention is concerned with a method of editing or readying single-tape picture and sound recordings, especially television recordings, and with apparatus for effecting the editing.

It is known to produce special films for the readying or editing (cutting) of sound films, which do not provide for a displacement or transposal between the picture recording and the sound recording. It must be considered in this connection that picture recordings and accompanying sound recordings cannot be scanned on a sound film at the same level because the picture scanning operation requires a steplike motion while the sound scanning requires continuous film motion. Accordingly, only the known socalled readying or cutting films will permit simultaneous cutting of picture and sound, unless it is desired to provide the picture and the sound on separate films which are in known manner separately cut.

It is also known, in connection with magnetic sound recordings, to record for the readying or editing the picture and the sound without displacement on a magnetic track of a common sound-film tape and to re-record the sound, after the cutting, on the same track transposed as needed for the standard. This procedure requires a special tape transport mechanism comprising, as seen in the direction of tape motion, a reading head, an erase head and a recording head, with the spacing between the reading and recording heads corresponding to the standard of the displacements, the displacement being eliminated by playback from the reading head to the recording head.

In the editing of magnetically recorded television productions there appears, as compared with sound films, the difficulty that the picture cannot be readily visually observed and, moreover, that the picture reproduction is possible only with the record carrier (tape) running at full speed. In the case of sound films, it is on the other hand, for example, in simple manner possible to project a picture at the intended cutting point with the picture standing still or with the film moving slowly through the projection apparatus of the cutting disk.

The object underlying the invention is to provide methods and devices for respectively facilitating the editing of picture and sound recordings and for making such editing at all possible for television recordings, especially in cases in which the reproduction of the picture recording is possible or desirable only at the operating speed of the record carrier.

More particularly, the invention makes it possible to carry out the editing of television productions recorded in accordance with the known Ampex method which is being used in many television stations around the world and which operates with a single recording tape for the picture and the sound.

It is in accordance with the invention proposed to mark the intended cutting points upon the picture-sound carrier or, in the case of separate carriers, at least upon one of such carriers, preferably by magnetic recording of cutting signals, and to cut in accordance with such signals.

In accordance with another feature of the invention, the sound and, if desired the cutting signal, are synchronously with the picture carrier played upon a preferably perforated auxiliary magnetic tape and are after the cutting played back on the picture carrier.

It is thereby in connection with combined picture-sound carriers with picture-sound displacement advantageous to play back the sound, preferably with simultaneous erasure of the original recording and restoration of the original picture-sound displacement.

In one embodiment of the invention, the auxiliary sound recording is, in the case of combined picture-sound carriers with picture-sound displacement, played back (intermediate sound recording) so that picture and sound are on the same level, and the displacement or transposal is after the cutting restored, preferably by replaying to the picture carrier, the sound of the auxiliary sound recording with a delay, preferably with simultaneous erasure of the displacement-free intermediate sound recording.

The invention further proposes to effect the magnetic recording of the cutting signals, for example, short sounds on a control track of the picture-sound carrier, during the projection thereof, at the instant of the intended cutting, and to scan the cutting signals incident to repeated projection, thereby determining the effect of the cutting, for example, by interruption of the picture and/or sound reproduction while preserving the cutting point as such by seeking the cutting signal with addition of the shifting of the cutting signal scanning head against the picture and/or sound scanning point. The scanning head for the cutting signals is thereby shifted, along the tape, for correction of the cutting point, with respect to the picture and/or sound scanning point.

In accordance with a further feature of the invention, a marking is provided at the picture cutting point, for example, by means of a soft marking pencil, which is determined by space measurement employing a measuring device such as a ruler or the like, measuring the space from the point of the cutting signal or from a device for determining the cutting signal on the carrier, for example, a flux dependent magnetic head, to the sound or picture scanning point.

In practicing the method according to the invention, the unperforated picture-sound carrier is incident to the replaying of the sound normally held in frictional engagement with a drive roller, by means of a pressure roller, and the drive roller is at least during the start or termination of the transport motion mechanically or electrically coupled, for example, by rotosyn-selsyn- or interlock means, with the drive of at least one further sound carrier, for example, a perforated carrier.

Upon attaining highest speed, the drive of at least one auxiliary, for example, perforated sound carrier, is automatically switched to synchronization, for example, by means of a timing relay governed by a control recording provided upon the picture-sound carrier.

The apparatus for practicing the invention comprises in addition to a tape transport mechanism provided at least with means for scanning the sound and the control recording of the picture-sound tape, at least one further transport mechanism for a perforated magnetic tape, which may be synchronized with the first named transport mechanism, and means for effecting synchronization during the start and conclusion of the transport motion by mechanical coupling means or by electrically governed shaft means, for example, a rotosyn converter or an interlock motor.

The marking of the cutting points is according to the invention advantageously effected by means of a picture-sound reproduction device provided with at least one reproduce head for the cutting signal, which is displaceable along the transport path of the tape, and if desired with a recording head which may likewise be displaceable.

The foregoing and further objects and features of the invention will appear from the description of embodiments thereof which will be rendered below with reference to the accompanying drawings, assuming use of the invention in connection with the known Ampex system for the magnetic recording of television productions. In the drawings, FIG. 1 illustrates apparatus for recording and reproducing television productions by means of magnetic tape, provided with an auxiliary device for marking the cutting points according to the invention;

Figure 8:
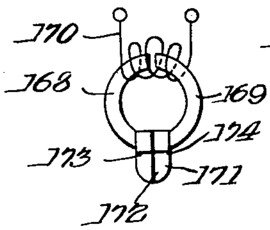
Figures 5, 9:
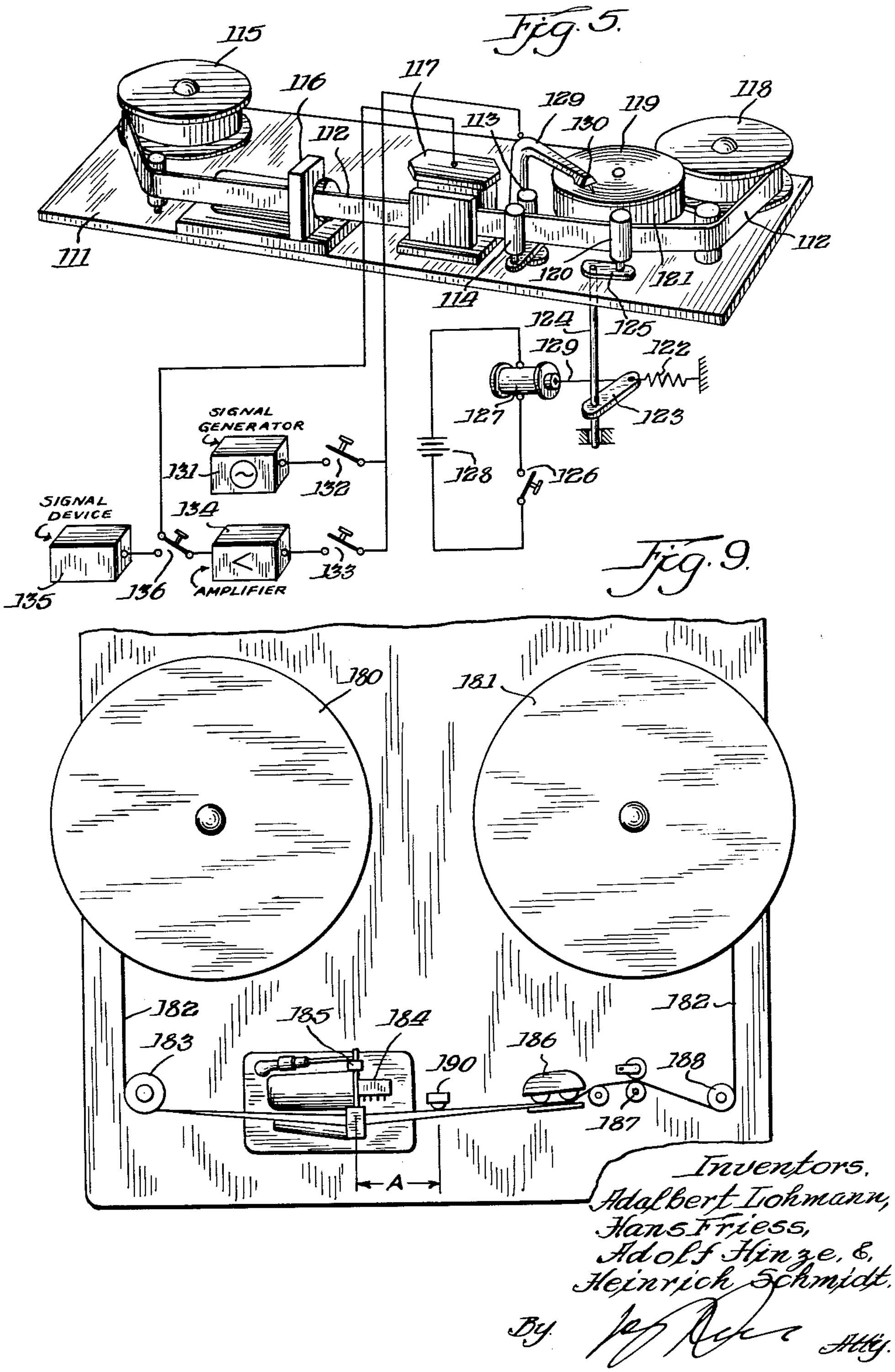
FIG. 5 illustrates a signal storage device driven together with the picture-sound tape, for recording a signal approximately at the instant of the desired cutting, the drive of the signal storage device being displaceable with respect to the picture-sound tape, such that the signal can be reproduced accurately timed with the intended cutting point.
Figure 7:
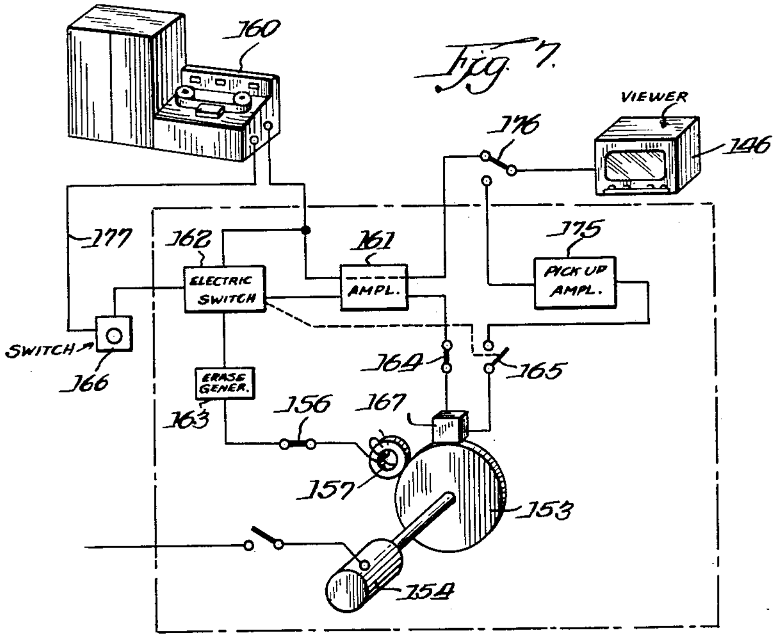

FIG. 8 indicates the structure of a magnetic head provided with a Hall generator, for use in the arrangement represented in FIG. 7; and FIG. 9 shows the tape drive and scanning means in connection with recording and reproduction in accordance with the Ampex system.

Figure 1:
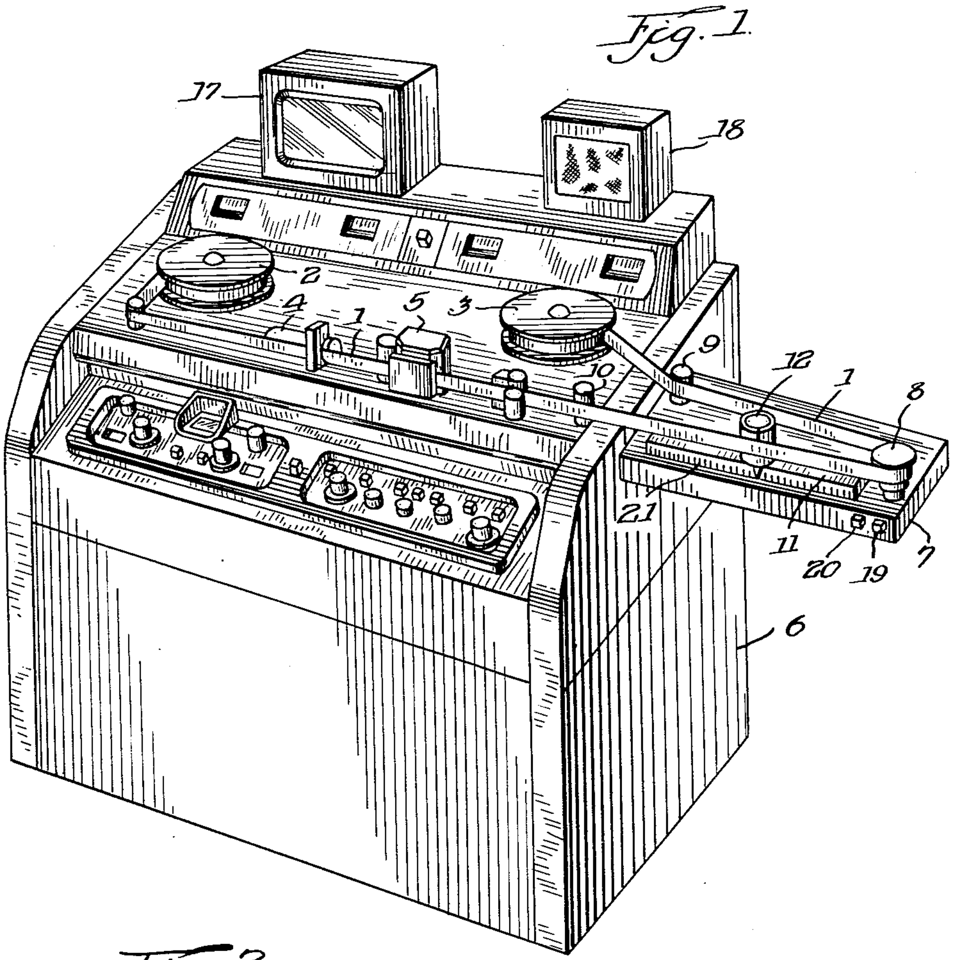

FIG. 1 shows apparatus for recording and reproducing television productions recorded upon a magnetic picture-sound tape 1. Numeral 2 indicates the tape storage reel and 3 the receiving reel. The recording and scanning of the picture signals is effected by the rotating magnetic head arrangement 4. A magnetic head device 5 which is in the direction of the tape motion displaced with respect to the magnetic head device 4 serves for the recording and reproduction of the control signals as well as for the sound recording and sound reproduction. In case of the Ampex system, which is being considered, the displacement amounts to 24 centimeter, that is, the sound recording and reproduction, respectively, precedes the picture recording by this amount. The displacement as to time thereby amounts to about 0.6 second.

It has been found that defects appear in the reproduction, after the cutting of such recording tapes, due to the sound being in point of time in advance of the picture signals. These defects are in accordance with the invention overcome by an auxiliary device 7 which provides an auxiliary loop for the tape 1 extending over rollers 8, 9, 10. Within this auxiliary loop, between the rollers 8 and 10 there is provided a magnetic head device 12 which is longitudinally displaceable (shiftable) along a guide 11. The device 12 permits recording and reproduction of signals, constituting cutting signals, which are placed on the picture sound tape 1 in defined spacing from the cutting points or directly at the places at which cutting is to be subsequently effected.

Figure 2:
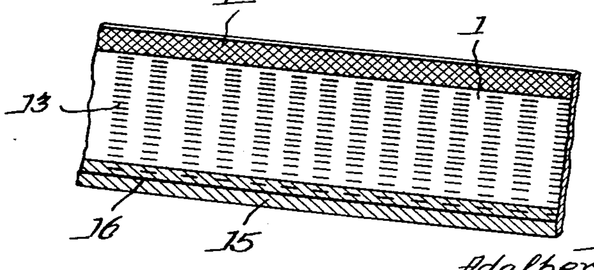
FIG. 2 shows in schematic manner a combined picture-sound tape for magnetically recording television productions employing a record tape with transverse track for the picture recording.

In the known Ampex system, the magnetic tape contains, as shown in FIG. 2, in addition to the picture recording tracks 13 which extend transverse to the direction of tape motion, a sound recording track 14 extending longitudinally of the tape, and also a control track 15 on which are continuously recorded control signals for maintaining the tape transport. Within the control track 15 is disposed a so-called prompting track 16 which is used for editing purposes and the like and upon which the cutting signals can be recorded in the form of short sound by the magnetic head device 12 shown in FIG. 1. It is, however, possible to use for the cutting signals impulses, prolonged sound or the like. It is also feasible to use in place of magnetic recordings visible markings, for example, color marks.

The marking of the intended cutting points is in case of the apparatus shown in FIG. 1 effected as follows:

The television production recorded upon the tape 1 is played by means of the magnetic head devices 4 and 5 and reproduced by means of the picture screen 17 and the amplifier 18. Upon appearance of a recording at which cutting should be carried out, the operator depresses the key 19 to effect recording of a cutting signal on the track 16 by the magnetic head 12. However, it cannot be expected that the cutting signal will in this manner always be placed on the exact place of the tape 1 or in correct spacing from the subsequent cutting signal and, in order to determine the exact cutting point, the operation is repeated to enable the operator to connect the magnetic head 12 with a recording device for the cutting signal, for example, by actuating a switch 20. The cutting signal may be reproduced, for example, by means of the amplifier 18.

In accordance with a preferred embodiment of the invention, the cutting signal may be employed for the actuation of a relay which effects interruption of the picture and/or sound reproduction, thereby demonstrating the effect of the intended cutting. For example, if the cutting signal has been recorded too late upon the tape 1, the head 12 may be shifted in a direction opposite to that of the tape motion to obtain premature scanning of the cutting signal, whereby the cutting signal is in a sense moved to the right point. The guide 11 for the cutting signal head 12 is advantageously provided with a scale 21 for indicating the spacing of the head 12 from the picture and sound scanning point corresponding to the magnetic head devices 4 and 5.

The cutting signal can be manually exactly localized by quick forth and back motion of the tape past the magnetic head 12 which advantageously is a flux dependent magnetic head, for example, like a Hall generator. The cutting signal can for the same purpose be made visible by means of an iron carbonyl dispersion. The cutting point may also be located on the tape 1 by measuring the distance between the magnetic head 12 and the magnetic head device 4, or the reading on the scale 21, from the point of the cutting signal. This point can be marked on the tape for subsequent cutting by means of a marking pencil.

It is in accordance with the invention also possible to play back the cutting signal directly to the cutting point of the sound, by scanning the cutting signal from the head 12 and recording it by means of a suitable amplifier and the magnetic head contained in the magnetic head arrangement 5 for the editing track 16 indicated in FIG. 2. The cutting signal can in this manner be transmitted directly to the sound cutting point, thereby eliminating the inconvenience of measuring. In order to avoid subsequent mistakes, the cutting signal first recorded by the magnetic head 12, which is now superfluous, may be erased directly after the playing back of the cutting signal from the magnetic head 12 to the magnetic head 5, by means of an erase device disposed, for example, directly adjacent to the magnetic head 12. Cutting of the tape is at this time of course impossible owing to the picture-sound displacement.

The elimination of the picture-sound displacement or transposal according to the invention will now be explained with reference to FIGS. 3 and 4.

Figure 3:
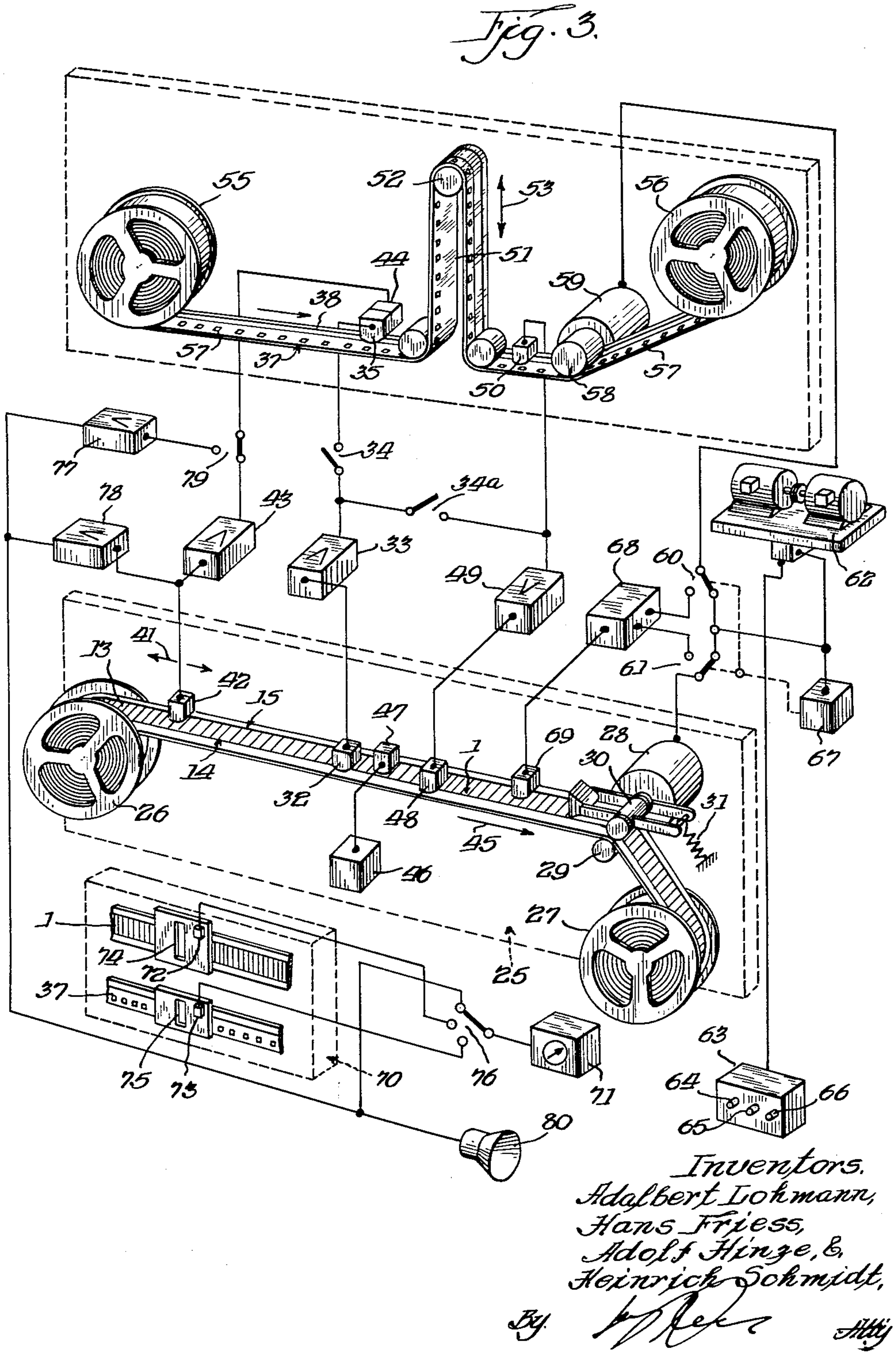
FIG. 3 represents in schematic manner apparatus according to the invention for the editing of television recordings as contemplated by the invention.

The rectangle 25 indicated in FIG. 3 in dash lines encloses a drive mechanism for the combined picture-sound tape 1 extending between the supply reels 26, 27.

In the case of Ampex recordings, the tape 1 contains a sound track 14, picture tracks 13 extending transverse to the direction of tape motion, and also a control and editing track 15, 16. The drive of the tape 1 is effected by a motor 28 through the medium of a smooth drive roller 29. A pressure roller 30, biased by spring 31, presses the tape 1 firmly against drive roller 29. The pressure roller 30 is placed in pressure position shortly before the start of the drive and termination thereof as well as during pauses, if desired, by means of a magnet which will be presently described in connection with FIG. 4. After recording of the cutting signal in the apparatus shown in FIG. 1, the picture-sound displacement can be eliminated upon the tape 1, by the arrangement according to FIG. 3. This is accomplished by scanning the sound recorded on the track 14, by means of a magnetic head 32 and playing back thereof by way of the amplifier 33, switch 34 and magnetic head 35 to the sound track 36 of the auxiliary sound carrier 37 which is driven by a drive mechanism contained within the rectangle 40 indicated in dash lines at the top of FIG. 3. This drive mechanism 40 can be synchronized with the drive mechanism 25 in a manner which will be presently explained. The auxiliary sound tape 37 has in addition to the sound track 36 a further track for the cutting signal.

In the embodiment shown in FIG. 3, the cutting signal can be scanned on the track 16 by a head 42 which can be shifted in the direction indicated by the arrow 41, and played to the cutting point of the sound by way of the amplifier 43 and the magnetic head 44.

When the cutting signal has been played back to the sound cutting point, by the apparatus described with reference to FIG. 1, as explained above, the cutting signal scanning head 42 will be on the tape 1 at the same level as the sound scanning head 32. The tape moves in the direction indicated by the arrow 45. The original sound recording on the track 14 is advantageously simultaneously erased by the erase head 47 connected with the erase generator 46. The nondisplaced recording of the sound is effected by the magnetic head 48 which is supplied by the amplifier 49. The required time delay is obtained by the position of the scanning head 50 on the auxiliary tape 37, in back of a loop 51 of the tape 37. The loop 51 can be made larger or smaller depending upon the desired time delay. The drive mechanism 40 for the auxiliary sound tape includes the tape supply reels 55, 56. The auxiliary sound tape 37 which is in this embodiment a perforated tape as indicated at 57, is effected by means of a sprocket 58 driven by a motor 59. It is, however, also possible to use instead of the sprocket 58 a smooth roller in the same manner as in the drive mechanism 25. For the regulation of the drive, the perforations can be scanned by electrical, electro-optical or mechanical means, for example, by driving the perforated tape by a smooth roller and scanning the perforations by means of a light source and a photocell, the photocell currents delivering signals corresponding to the tape speed, which can be directly utilized for corrective control of the tape drive or after comparison with a fixed frequency.

In the embodiment according to FIG. 3, the synchronous drive motors 28 and 59 are, for the synchronous start of the driving mechanisms 25 and 40, connected by way of switches 60, 61, to a frequency converter 62, known under the name rotosyn converter. Such a converter permits synchronous start of the motors 59 and 28 from standing still by first connecting a direct voltage on which is superposed during the starting operation an alternating voltage the frequency of which is continuously varied. The drive operations are controlled by a device 63 provided with three buttons 64, 65, 66, respectively for forward drive, reverse drive and stop.

The non-perforated combined picture-sound tape 1 might slip in extended operation with respect to the drive roller 29 of the drive mechanism 25, which would disturb the synchronous advance of the tape 1 relative to the auxiliary tape 37. In order to counteract this danger, there is provided an automatic control device 67 for actuating the switches 60, 61 as soon as the tapes 37 and 1 are running at full speed. The drive motors 28 and 59 are thereupon supplied by way of the amplifier 68 which delivers an alternating voltage the frequency of which is determined by the control signals recorded on the control track 15 of the picture-sound tape 1. This control signal is scanned by the magnetic head 69. However, it is also possible to feed to the motor 28, during the operation thereof at full speed, an alternating current with constant frequency, while supplying an alternating voltage corresponding to the control recording to be scanned along the control track of the sound tape 1, only to the synchronous motor 59 of the drive mechanism 40 and, if present, to the drive motors of further drive mechanisms for auxiliary tapes. The switch-over device 67 which effects the switches 60 and 61, as indicated by the dash lines, may contain a timing relay for automatically effecting, after the start time of, for example, 0.3 second and during the termination of the drive, the switching from the rotosyn source to the pilot sound synchronization. The synchronization can also be effected in accordance with other systems, for example, in accordance with the selsyn or interlock system. It is moreover possible to carry out the switching by means of a frequency relay which is responsive to the frequency delivered by the rotosyn converter 62 for switching the contacts 60 and 61 after the start and prior to the termination of the tape advance.

The arrangement according to FIG. 3 permits operation, in addition to the drive mechanism 40, of further drive mechanisms for auxiliary sound tapes synchronously with the drive mechanism 25, for the purpose of mixing with the original sound recording material such as noises and the like which are recorded on the further auxiliary sound tapes. This may now be effected only with the auxiliary sound tape 37 advanced by the drive mechanism 40 so that the original sound recording on the combination picture-sound tape 1 is for the time being preserved. It is, however, also possible to leave the recording played back on the auxiliary sound tape 37 during the readying unchanged as a reserve recording.

It is advantageous for the cutting of the combination picture-sound tape 1 to provide a cutting device 70 structurally combined with the drive mechanism 25 for receiving the combination picture-sound tape 1 and at least one auxiliary sound tape such as 37 after removal thereof from the respective drive devices. Magnetic head Hall generators are advantageously provided for the accurate location of the cutting places, such generators permitting accurate localization, even with the tape standing still or moving slowly, of magnetically recorded signals, for example, the cutting signals or of the impulses which designate the severing points of the individual half-pictures of television recordings. For this purpose, there is provided an indicating device 71, for example, a pointer instrument or an oscilloscope tube which may be connected with the magnetic heads of the Hall generators 72, 73. Cutting devices 74, 75 are provided at the same places as the magnetic heads 72, 73 or in defined spacing relative thereto, for cutting the respective tapes 1 and 37.

The indicating device 71 can moreover be utilized, in a connection by way of the switch 76, to indicate the cutting signals respectively scanned on the combination picture-sound tape 1 by the cutting signal head 42 and on the auxiliary sound tape 37 by the cutting signal head 44. Amplifiers 77 and 78 are provided for amplifying these signals in a circuit selectively established between the cutting signal scanning head 41 and amplifier 77, by way of switch 79.

A loudspeaker 80 may likewise be employed for indicating the cutting signals recorded respectively on the tapes 37 and 1. Such a cutting signal in the form of a short sound may be made audible in the loudspeaker by moving the tape on which it is recorded manually forth and back relative to the magnetic head. The cutting signal may already in this manner be nearly accurately localized, thus also directly and indirectly localizing the cutting point (displacement) which can be made visible by a marking pencil. The accurate localizing of the picture cutting point is suitably carried out with the aid of the magnetic heads with Hall generators 72, 73, contained in the cutting device 70, in conjunction with the indicating device 71. The magnetic recording signals may also be made visible in known manner with the aid of an iron carbonyl dispersion which is, however, less efficient than the procedures noted herein.

Once the cutting of the picture-sound tape is completed, the picture-sound displacement must be restored again so as to make simultaneous reproduction of picture and sound possible. The sound is for this purpose scanned by means of the magnetic head 32 and transmitted by way of the amplifier 33 and switch 34*a* to the amplifier 49, switch 34 being thereby open. The amplifier 49 supplies the recording head 48 which is arranged in such spacing with respect to the magnetic head 32 that the required displacement between picture and sound is secured. The erase generator 46 is during this procedure in operation and the non-displaced sound recording on the tape is thus simultaneously erased. It is, however, also possible, for example, to produce the displaced or transposed sound recording by playback from the auxiliary sound tape 37. In order to secure proper insertion of the record tapes 1 and 37, start marks may be used, aside from known visual start marks, which are like the cutting signals magnetically recorded. Attention is further directed to the fact that the auxiliary sound tape or carrier 37 need not move with the same speed as the combination picture-sound tape or carrier 1.

In place of the drive device 25, there may also be used a modified machine for the recording and reproduction of television productions (video recorder) having in place of the picture recording means, for the production of the non-transposed recording, a magnetic head for the sound. The synchronization of this device with the drive device for the auxiliary sound tape is suitably effected in the manner already described, by means of a socalled electrical shaft, that is, by means of a rotosyn converter, interlock or selsyn system or by means of a control recording upon a carrier in accordance with the so-called pilot sound system.

In place of the described direct synchronization between the drive devices 40 and 25, by the control signal on the picture-sound tape 1 during the advance thereof at full operating speed, there may also be used a so-called indirect pilot sound synchronization in which the control signal is compared with a normal frequency, frequency of the commercial current supplied to the respective drive motor, deriving from such comparison a corrective voltage for the drive.

The drive devices 25 and 40 shown in FIG. 3, respectively for the combination picture-sound tape and the auxiliary sound tape, may be spatially separated or combined in a structural unit. It is in the latter case advantageous to couple the two drive devices operatively during the start and prior to the termination of the advance, by means of a coupling, for example, in the form of a gear or a belt. An embodiment of such drive device is shown in FIG. 4.

Figure 4:
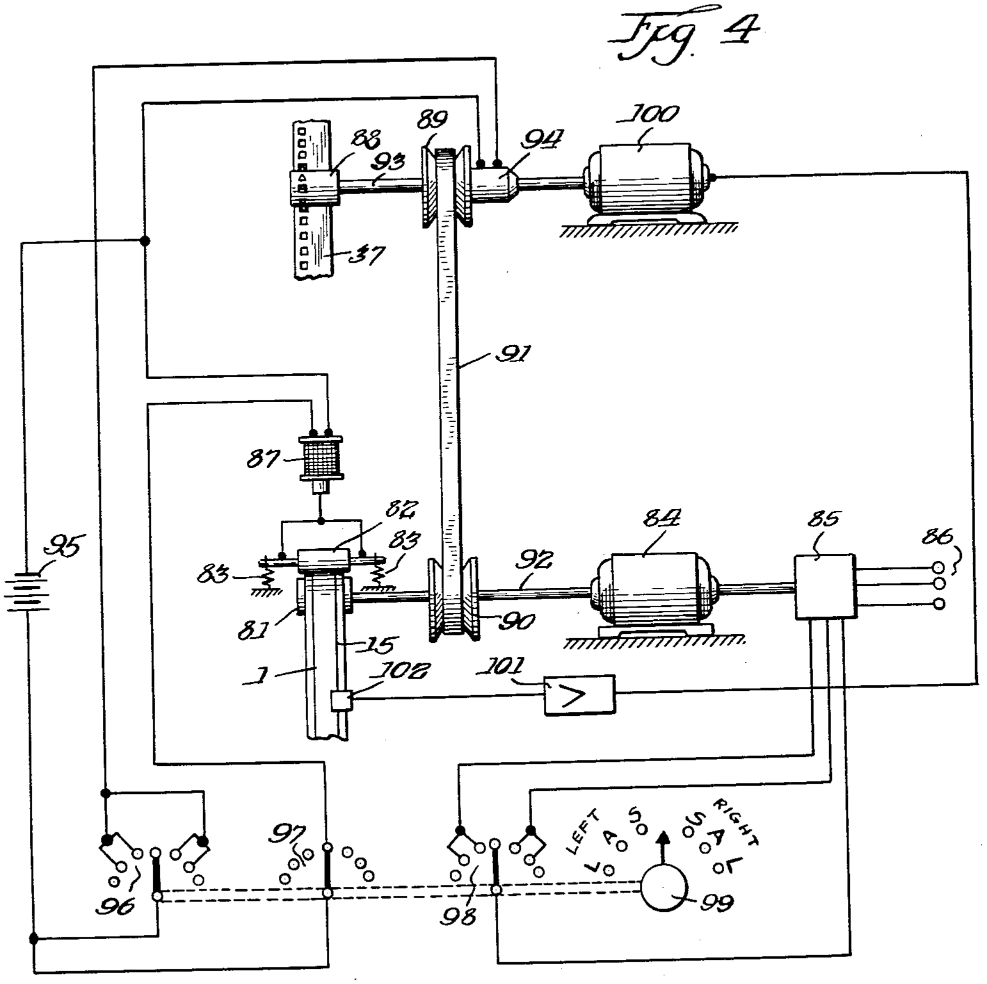
FIG. 4 shows an example for the synchronization applied according to the invention between the drives for the transport mechanism for the picture-sound tape and an auxiliary sound tape.

Referring to FIG. 4, numeral 81 indicates a smooth drive roller for the combination picture-sound tape 1 which is pressed into engagement with the drive roller 81 by means of a rubber roller 82 biased by springs 83. The drive roller 81 is driven by the synchronous motor 84 which is by way of a relay switch 85 connected with a suitable current source 86 or with a suitable converter, for example, a rotosyn converter and the like. The rubber pressure roller 82 can be lifted by a magnet 87 so as to effect insertion of the picture-sound tape 1. It is moreover advantageous to lift the rubber pressure roller 82 during non-operating intervals, so as to retain its circular configuration. The magnet 87 is positively controlled for operating the pressure roller 82 so as to press the picture-sound tape 1 in engagement with the drive roller 81 prior to the start and until termination of the tape advance. The arrangement may also be such as to effect the pressure operation of the roller 82 by an electromagnet while effecting the lifting off of the roller by spring means.

The drive of the perforated auxiliary sound tape 37 is effected for the start of the tape advance by a sprocket 88 carried by a shaft 93 which is rotated by a pulley 89 engaged by belt 91 extending over a pulley 90, the latter being rotated by the shaft 92 controlled by motor 84. The pulley 89 is rotatably journalled on the shaft 93 and is operatively coupled therewith by means of an electrically controlled clutch 94. The clutch 94 may, for example, be in the form of an electromagnetically operated friction clutch or in the form of an electromagnetically actuated magnetic clutch. Such clutch devices are known.

In the embodiment illustrated in FIG. 4, the coupling of the shaft 93 with the pulley 89 is effected upon actuation of the clutch 94 responsive to current conducted thereto from the source 95 by way of a contact set 96. The contact set 96 is for its actuation mechanically linked with contact set 97 (over which the magnet 87 is energized) and with contact set 98 which is in turn linked with a control member 99, knob or hand wheel or the like. In central or zero position of the control member 99, the magnet 87 will be supplied with current. The rubber pressure roller 82 is accordingly in raised position, permitting insertion of the picture-sound tape 1. Rotation of the control member 99 to the left or to the right, into the respective position "S" prepares for the start of the tape advance respectively in left or right direction. Current is in these positions "S" disconnected from the magnet 87, making the pressure roller 82 operative, while current is supplied to the clutch 94 by way of the contact set 96. Further operation of the control member 99 to the position "A" effects operative actuation of the relay switching device 85, by way of contact set 98, thereby connecting the motor 84 with the current supply 86 and thus effecting start of the tape advance. Since the clutch 94 is operatively actuated, the shaft 93 will be rotated by the action of the belt 91 and the auxiliary sound tape 37 will accordingly be driven synchronously with the picture-sound tape 1. After attainment of the advance speed in accordance with the r.p.m. of the motor 84, the control member 99 is moved to position "L" thereby disconnecting the current source 95 at contact set 96 from the clutch 94. The further drive of the tape 37 is thereafter effected in accordance with the known pilot sound procedure, by the synchronous motor 100 connected with the shaft 93, the motor 100 being supplied from the amplifier 101 which in turn receives an alternating voltage from the magnetic head 102, such alternating voltage being recorded along the track 15 of the picture-sound tape 1 as a control recording. In order to stop the drive device, the control member 99 is moved back to the position "S." The advance of the tapes to stop position is now effected synchronously since the clutch 94 is operative again to rotate the sprocket 88 by the operation of the belt 91.

In the embodiment according to FIG. 4, the switching over from the mechanical clutch to the pilot sound synchronization, incident respectively to the start and termination of the tape advance, can likewise be effected by means of a timing relay or the like.

The invention, so far as described above, will now be briefly summarized as an aid to the understanding of further features and objects which will be presently explained respectively with reference to FIG. 5 and FIGS. 6–9.

The invention so far as described proposes to mark a cutting point or place on a picture-sound carrier or tape, for example, on a magnetic television recording made according to the Ampex method, during the playing thereof, by magnetically recording on a control track of the tape at the instant of the intended cutting, a cutting signal, for example, a brief sound. The playing of the production is thereupon repeated and the cutting signal is scanned. The scanning of the cutting signal can be made audible or the effect of the intended cutting can be reproduced, for example, by interruption of the picture and/or sound playing. The cutting point as such is obtained by seeking the cutting signal and thereby also taking into consideration the space from the cutting signal scanning head to the picture and sound scanning point, respectively. Since it cannot be expected, generally, to immediately succeed marking the cutting point accurately by the cutting signal, the invention proposes to dispose the scanning head for the cutting signals, relative to the picture and sound scanning point, movably lengthwise of the tape. Incident to repeated playing of the tape, the scanning head for the cutting signal is shifted, for example, until the interruption of the picture reproduction, effected by the reproduction of the cutting signal, takes place at the correct point. The cutting point can then be found by measuring the spacing between the cutting signal, scanning head and the picture and sound recording point. It is, as proposed, also possible to play back the cutting signal directly at the sound scanning point, since the sound head and the head scanning the control track are in the Ampex system adjacently disposed.

However, a difficulty attending such operation resides in the necessity of erasing the first signal which does not yet lie accurately at the cutting point, thereby affecting auxiliary control recordings that may in certain circumstances be contained in the control or editing track.

In order to avoid this drawback, the invention proposes to drive together with the picture-sound carrier or tape a signal storage device upon which is recorded a signal, approximately at the instant of the intended cutting, and thereafter displacing the drive of the signal storer with respect to the picture-sound tape, such that the signal can in point of time be reproduced accurately in agreement with the intended cutting point. For this purpose, there is provided at the recording and reproduction apparatus a storer which is as needed frictionally driven by the picture-sound tape. In a preferred embodiment, the storer is made in the form of a plate or disk provided with a layer or coating of magnetizable material and carrying a circularly or spirally extending recording track.

An embodiment incorporating the above indicated features is shown in FIG. 5.

Referring now to FIG. 5, numeral 111 indicates the drive mechanism or device of a recording and reproduction apparatus for magnetic television recording according to the Ampex system. The magnetic tape 112 is transported by means of a friction roller 113 cooperating with a pressure roller 114. The tape 112 is drawn from a supply reel 115 and moved past the rotating magnetic head device 116 for the picture recording and conducted to the magnetic head device 117 containing magnetic heads for the sound recording and scanning as well as for the production of the control and editing recordings. The storage reel is designated by numeral 118.

The storer provided according to the invention comprises in the illustrated example a magnetizable plate 119 which is frictionally driven by the tape 112 responsive to the pressure roller 120 pressing the tape 112 in engagement with the drum 121 which forms a carrier for the plate 119. The pressure roller 120 is normally held disengaged from the tape 112 by the operation of a spring 122 acting on lever 123 and through the medium of shaft 124 on lever 125 carrying the roller 120. The disk or plate 119 is accordingly rotated only upon closure of switch 126, closing a circuit for magnet 127 from the current source 128, thereby effecting energization of the magnet 127 which pulls a cable 129 to rotate the lever 123 and therewith lever 125 counterclockwise against the force of spring 122, thus pressing the roller 120 against the tape 112 and thereby pressing the tape into engagement with the drum 121 to rotate the disk or plate 119.

The plate 119 contains a circular or spiral sound track having a guide for the magnetic recording and reproduce head 130 carried by the pickup arm 129. If desired, the recording of the cutting signal can be effected without high frequency premagnetization. A magnetic erase head may be provided on the structure; it is, however, possible to remove the plate 119 from the drum 121 and to effect erasure by introducing the plate into the field of an erase coil. A signal marking the cutting point is recorded on the plate 119 by closing the switch 132 to connect the signal generator 131 with the head 130. The signal may be picked up by opening switch 132 while closing switch 133. The scanned signal is amplified in the amplifier 134 and is either conducted to the signal device 135 by way of switch 136 or transmitted to the magnetic head device 117 which effects recording of the signal on the editing or control track of the tape 112. The signal or indicating device 135 may be in the simplest case a loudspeaker device; however, it will be more favorable to use instead of a loudspeaker, a relay device such as described in connection with the previously explained embodiment, which is operative to interrupt the picture and/or sound reproduction responsive to the scanning of the cutting signal on the plate 119. In case the first attempt to place the cutting signal at the proper point, by closure of the switch 132 which may, for example, be in the form of a push button, should fail, the drum 121 or the plate 119 may be rotated by hand relative to the tape 112 so as to carry out the necessary correction.

A mechanical storer of a construction different from the magnetic storer may be employed for the storing of the cutting signal. For example, it is possible to provide a mechanical counter operating similar to a meter, which is placed in operation, responsive to appearance of the desired cutting point, by drive connection with the tape, effected by a pressure roller, at the same time closing a contact. The counter remains in drive engagement with the tape incident to reverse drive and play thereof, and the contact closes again at the same point of the tape at which the counter had been operatively connected. A correction of the instant at which the contact closes with respect to the recording is with frictional connection possible just as in the above described embodiment. The closure of the contact may be utilized for releasing the operation of a signalling device for the reproduction of the cutting and also for releasing the operation of a signal generator for playing back the cutting signal to the cutting point on the control track.

The initially described embodiment discussed in connection with FIGS. 1 to 4 has the drawback that the picture which is reproduced ahead of the cutting point is only briefly visible, since reproduction is in case of magnetic recording possible only with the recording tape or carrier running at full speed. The invention proposes to eliminate this drawback.

In accordance with the invention, at least one half-picture is stored in a separate picture storer and reproduced as a standing picture, which is effected during the playing, automatically by the scanned cutting signal or by manual operation, if desired in conjunction with subsequent stopping of the picture-sound tape. The cutting signal is for this purpose stored in a storage device, for example, a magnetic disk or plate which is driven simultaneously with or by the picture-sound tape; the cutting signal can be displaced with respect to the picture-sound tape by adjusting the storage drive. The procedure is preferably such that the tape is stopped directly after transmission of a picture selected by the operation of a switch and that a cutting signal is recorded on the picture-sound tape to take the place of the selected picture.

In accordance with the invention, there is provided, in addition to picture-sound recording and reproduction apparatus, a storage device for storing and reproducing as a standing picture at least one half-picture of the recording.

In accordance with a further feature of the invention, the storage device comprises an endless magnetic record carrier, for example, a drum or disk or the like, which is driven at uniform speed.

In accordance with another feature, the invention proposes for the magnetic storing and reproduction of the signals of at least one picture, the following possibilities, namely, (*a*) a frequency modulated picture signal, taken from the reproduction apparatus, is immediately magnetically recorded, such signal being scanned, conducted to the reproduction apparatus for demodulation, and from there conducted to a viewing device; and (*b*) an unmodulated or already demodulated picture signal is recorded and a magnetic head with Hall generator is employed for the scanning thereof.

It is, however, also possible to employ a storage tube for the reproduction of a standing picture selected from a continuous recording, thus avoiding the use of a special magnetic storer. The magnetic storer has on the other hand the advantage that a normal television viewing device can be used for the reproduction.

In case of operation providing for stopping of the recording tape immediately after transmission of a picture to the storer, there is suitably provided a head for placing, upon disconnection of the tape drive, the cutting signal at the point of the tape at which the picture recording (or the associated sound recording) was located which was transmitted to the storer prior to such disconnection.

Embodiments incorporating the above noted features will now be described with reference to FIGS. 6 to 9.

Figure 6:
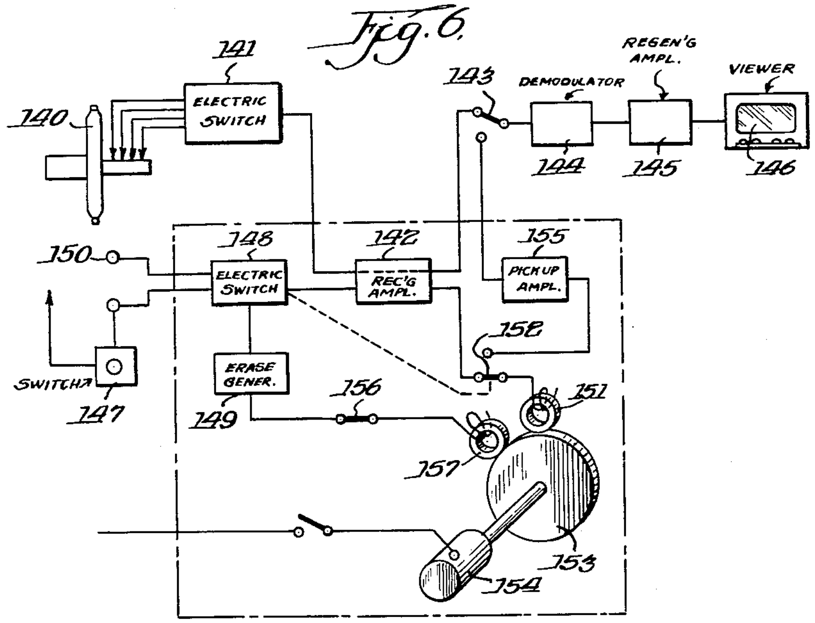
FIGS. 6 and 7 show devices for extracting a single picture from a production and to reproduce such picture as a standing picture so as to facilitate observation desired for the determination of cutting points.

In FIG. 6, numeral 140 indicates a rotating magnetic head device of a recording and reproduction apparatus for magnetic television recordings according to the Ampex system. The frequency modulated video signal scanned by the magnetic head device 140 is by way of an electronic switch 141 passed through a recording amplifier 142. After passing through the recording amplifier 142, the signal is normally conducted by way of switch 143 directly to the demodulator 144 and by way of a regenerating amplifier 145 to a viewing device 146 for the synchronizing signals. Switch 147 is actuated to cause operation of an electronic switch 148 for the purpose of extracting a single picture from the production and to reproduce such single picture as a standing picture. The electronic switch 148 regulates the proper recording duration of the picture by temporarily cancelling from the synchronous signal mixture conducted to the terminal 150, by the aid of the video pulses, the blocking of the amplifier 142 and of the erase generator 149, namely, for the duration of one or two half-pictures. The switching of the magnetic head 151 by contact 152 to the reproduce amplifier is similarly controlled by the electronic switch 148. The disk 153 is driven by motor 154 with uniform speed, for example, 25 revolutions per second and a peripheral speed, for example, of 40 meters per second. Two successive half-pictures are recorded in this case. The motor may run with 50 revolutions per second if only one half-picture is to be stored. The diameter of the disk may be reduced with uniform peripheral speed. The motor 154 may be a synchronous motor connected to an alternating current source with constant frequency. After a picture is recorded upon the disk 153, serving as a storer, contact 152 may be switched over by the action of the electronic switch 148 to connect the magnetic head with the reproduce amplifier 155. After the synchronizing signal, the electronic switch 148 connects the recording device of the disk 153. The signal can be conducted to the demodulator 144 by way of switch 143. The reproduction is effected as a standing picture by means of the viewing device 146. The drive of the picture-sound tape can be disconnected by the switch 147, that is, the tape can be stopped with a delay corresponding to the time required for the storing of a picture. As will be presently explained more in detail, a signal may be placed at the point at which the picture stored on the disk 153 is recorded upon the picture-sound tape, such signal facilitating subsequent location of the cutting point.

FIG. 7 shows another embodiment of the invention for extracting a single picture from the production and for reproducing such picture as a standing picture. Numeral 160 indicates the picture reproduction apparatus from which the demodulated video signal is taken and conducted to the amplifier 161. The electronic switch 162 receives at the same time the synchronizing signal and controls in previously described manner the erase generator 163 as well as the contacts 164, 165 so as to effect by the actuation of the switch 166 recording of a picture upon the magnetic carrier 153 which corresponds to the identically referenced carrier shown in FIG. 6. Numeral 157 indicates the erase head which is likewise similarly referenced in FIG. 6. However in the embodiment according to FIG. 7, there is provided a magnetic head 167 with Hall generator, so as to permit the scanning of the very low frequencies of the television signals.

As shown in FIG. 8, the magnetic head 167 (FIG. 7) may have a core consisting of two half rings 168, 169, made of ferrite and provided with hard material pole pieces. The video signal is incident to the recording conducted to the winding 170, while the reproduce or pickup voltage is taken from a Hall generator 171 disposed in the working gap 172 between the pole pieces 173 and 174. Magnetic heads of this kind have been proposed before.

For the reproduction of the signal recorded on the disk 153 (FIG. 7), there is provided a pickup amplifier 175 which can be connected with the viewing device 146 by means of switch 176. As indicated by line 177, the reproduction apparatus 160 can be stopped with time delay under control of the switch 166. The direct recording of the video signal and subsequent reproduction by means of the Hall head permit the use of any other video picture source in the place of the picture apparatus 160.

It will be seen from the foregoing explanations with reference to FIGS. 6 and 7, that the reproduction of a picture taken from a continuous recording is effected by the actuation of switches 147 and 166, respectively. The record carrier or tape can be simultaneously stopped as described. This provides the possibility to place a marking upon the record carrier, that is, upon the combination picture-sound tape employed in the Ampex system, at the place thereof at which is recorded the picture appearing on the viewing device 146 as a standing picture.

FIG. 9 shows in schematic manner the drive of a recording and reproduction apparatus according to the Ampex system. Numeral 180 indicates the supply reel and numeral 181 the receiver reel for the magnetic tape 182. The tape 182 is guided over a deflection roller 183 to the picture recording device 184 which is provided with rotating magnetic heads 185. A magnetic head arrangement 186 serves for the recording and pickup of the sound- and control signals. Numeral 187 indicates the friction roller drive. The tape 182 is guided to the receiver reel 131 over deflection roller 188. After the disconnection of the tape drive, the tape will come to a standstill after a brief coasting interval. The path through which the portion of the tape 182 which is at the instant of disconnection of the drive in engagement with the magnetic heads 185, moves after the disconnection as indicated by A. There may be provided a magnetic head 190, spaced from the rotating head 185 by the distance A, for recording, for example, on the control track, signals (cutting signals) for marking the cutting points.

The marking of the cutting points is in practice effected by reproducing the recording and by actuating the switch such as 147 (FIG. 6) or 166 (FIG. 7) at the point at which cutting is desired. The picture reproduced at this instant is for closer observation available at the viewing device 146. The picture-sound carrier, that is, the magnetic tape 182 (FIG. 3) is advantageously stopped. Upon obtaining, in repeated playing of the recording, appearance on the viewing device 146 of the picture at the desired cutting point, the corresponding place on the tape 182 is provided with a signal by means of the magnetic head 190.

It is, however, possible to provide, if desired additionally, a marking for the cutting point which is visible without aid, at a spacing A from the magnetic heads 185, by means of a marking pencil or the like.

It is also possible to use in place of the magnetic storer 153 (FIGS. 6 and 7), a known storage tube for the storing of individual television pictures.

It is further possible, as already proposed, to record the signal denoting the cutting place (cutting signal) upon a storer driven by the picture-sound tape and to facilitate the recording of an individual television picture, during the continuous reproduction, by scanning such signal automatically under control of an electronic switch such as 148 shown in FIG. 6 or 162 as shown in FIG. 7.

The invention which has been described for use in connection with a combination (single tape) picture-sound carrier can also be used in connection with separate record carriers or tapes for picture and sound, for example, sound films. The invention is with particular advantage applicable in connection with all invisible recordings.

Changes may be made within the scope and spirit of the appended claims which define what is believed to be new and desired to have protected by Letters Patent.

We claim:

1. An editing apparatus for picture-sound television recordings on a single tape wherein the sound material is longitudinally displaced relative to the corresponding picture material, comprising means for driving such a tape at normal transport speed, means for simultaneously reproducing the picture and sound material carried on such tape, a magnetic recording head disposed for coaction with such a tape, means for selectively supplying to said recording head a cutting signal for marking such a tape in predetermined relation to the simultaneously viewed picture material thereon, an auxiliary perforated tape, means for driving such tape, means cooperative with said tape driving means for synchronizing the auxiliary tape with such a sound-picture tape, means disposed for coaction with said tapes for recording sound from the picture-sound tape on said auxiliary tape, means disposed for coaction with said tapes for recording sound from said auxiliary tape on said sound-picture tape with the original amount of displacement relative to the corresponding picture material, said picture-reproducing means including a viewer, and means controlled by the cutting signal for reproducing, as a standing picture, at least one half-picture of the recording on such picture-sound tape.

2. Apparatus as defined in claim 1, wherein said picture-sound reproducing means comprises at least one pickup head for the cutting signal, and means for disposing the respective pickup and recording heads for the cutting signal for selective displacement in the direction of tape advance.

3. Apparatus according to claim 1, wherein said synchronizing means comprises a mechanical coupling.

4. Apparatus according to claim 1, wherein said synchronizing means comprises an electrical coupling.

5. An editing apparatus for picture-sound television recordings on a single tape wherein the sound material is longitudinally displaced relative to the corresponding picture material, comprising means for driving such a tape at normal transport speed, means for simultaneously reproducing the picture and sound material carried on such tape, a magnetic recording head disposed for coaction with such a tape, means for selectively supplying to said recording head a cutting signal for marking such a tape in predetermined relation to the simultaneously viewed picture material thereon, an auxiliary perforated tape, means for driving such tape, means cooperative with said tape driving means for synchronizing the auxiliary tape with such a sound-picture tape, means disposed for coaction with said tapes for recording sound from the picture-sound tape on said auxiliary tape, means disposed for coaction with said tapes for recording sound from said auxiliary tape on said sound-picture tape with the original amount of displacement relative to the corresponding picture material, and control means including coupling means for synchronizing the picture-sound tape, upon attaining full speed, with at least one further sound tape under control of a control recording carried by said picture-sound tape, and switching means for said synchronizing controlled by said coupling means.

6. Apparatus according to claim 5, comprising a smooth drive-roller for driving the non-perforated picture-sound tape, by pressure engagement therewith, and means for controlling the drive roller to effect positive drive engagement thereof with said tape.

7. Apparatus according to claim 6, comprising at least one magnetic head cooperatively associated with the picture-sound tape for determining the cutting signal, an amplifier, an indicating device, and means for connecting said head with said indicating device by way of said amplifier.

8. Apparatus according to claim 7, comprising a cutting device disposed along the path of tape advance in defined relation to said magnetic head.

9. Apparatus according to claim 1, wherein said auxiliary tape drive means includes means for forming a tape loop which is adjustable with respect to the picture-sound displacement, and means at the ends of said loop for scanning the corresponding tape.

10. An editing apparatus for picture-sound television recordings on a single tape wherein the sound material is longitudinally displaced relative to the corresponding picture material, comprising means for driving such a tape at normal transport speed, means for simultaneously reproducing the picture and sound material carried on such tape, a magnetic recording head disposed for coaction with such a tape, means for selectively supplying to said recording head a cutting signal for marking such a tape in predetermined relation to the simultaneously viewed picture material thereon, an auxiliary perforated tape, means for driving such tape, means cooperative with said tape driving means for synchronizing the auxiliary tape with such a sound-picture tape, means disposed for coaction with said tapes for recording sound from the picture-sound tape on said auxiliary tape, means disposed for coaction with said tapes for recording sound from said auxiliary tape on said sound-picture tape with the original amount of displacement relative to the corresponding picture material, and a storer cooperatively associated with said picture and sound reproducing device which is frictionally driven by the picture-sound tape and constructed to receive and store the cutting signal for subsequent coordination with the desired cutting point.

11. Apparatus according to claim 10, wherein said storer includes a plate provided with a layer of magnetizable material containing a recording track.

12. Apparatus according to claim 10, wherein said storer includes a magnetizable plate which is frictionally driven by said picture-sound tape permitting angular displacement thereof with respect to said tape.

13. Apparatus according to claim 1, wherein said means under control of the cutting signal comprises a storer device disposed adjacent to the picture-sound recording and reproducing apparatus for storing and reproducing as a standing picture at least one half-picture of the recording on said picture-sound tape.

14. Apparatus according to claim 13, wherein said storer device comprises an endless magnetic carrier driven at uniform speed.

15. Apparatus according to claim 14, comprising means for magnetically recording frequency modulated picture signals, means for scanning such recorded signals, and means for demodulating said scanned signals for the reproduction thereof.

16. Apparatus according to claim 14, comprising means for recording picture signals which are respectively unmodulated or demodulated, and a magnetic head having a Hall generator for scanning such signals.

17. Apparatus according to claim 13, comprising a storage tube for reproducing as a standing picture a picture selected from the continuous recordings on said picture-sound tape.

18. Apparatus according to claim 13, comprising a magnetic head for impressing a cutting signal, said head being disposed at a point of the path of the tape advance at which, after the stopping of the tape drive, is located the picture recording transmitted to said storer device.

19. An editing apparatus for picture-sound television recordings on a single tape wherein the sound material is longitudinally displaced relative to the corresponding picture material, comprising means for driving such a tape at normal transport speed, means for simultaneously reproducing the picture and sound material carried on such tape, a magnetic recording head disposed for coaction with such a tape, means for selectively supplying to said recording head a cutting signal for marking such a tape in predetermined relation to the simultaneously viewed picture material thereon, said picture-sound reproducing means comprising at least one pickup head for the cutting signal which pickup head is displaceable in the direction of tape advance, and control means for operatively affecting said picture and sound reproducing means by the scanned cutting signal, said control means comprising a relay which is operatively actuated for interrupting the reproducing incident to the scanning of the cutting signal.

20. An editing apparatus for picture-sound television recordings on a single tape wherein the sound material is longitudinally displaced relative to the corresponding picture material, comprising means for driving such a tape at normal transport speed, means for simultaneously reproducing the picture and sound material carried on such tape, a magnetic recording head disposed for coaction with such a tape, means for selectively supplying to said recording head a cutting signal for marking such a tape in predetermined relation to the simultaneously viewed picture material thereon, an auxiliary perforated tape, means for driving such tape, means cooperative with said tape driving means for synchronizing the auxiliary tape with such a sound-picture tape, means disposed for coaction with said tapes for recording sound from the picture-sound tape on said auxiliary tape, means disposed for coaction with said tapes for recording sound from said auxiliary tape on said sound-picture tape with the original amount of displacement relative to the corresponding picture material, said auxiliary tape driving means comprising a smooth drive roller, means for scanning the perforations of the sound tape, and means for corrective regulation of the speed of tape advance with other tape means.

21. An editing apparatus for picture-sound television recordings on a single tape wherein the sound material is longitudinally displaced relative to the corresponding picture material, comprising means for driving such a tape at normal transport speed, means for simultaneously reproducing the picture and sound material carried on such tape, a magnetic recording head disposed for coaction with such a tape, means for selectively supplying to said recording head a cutting signal for marking such a tape in predetermined relation to the simultaneously viewed picture material thereon, said picture-sound reproducing means comprising at least one pickup head for the cutting signal which pickup head is displaceable in the direction of tape advance, and control means for operatively affecting said picture and sound reproducing means by the scanned cutting signal, said control means being operative to interrupt the reproducing incident to the scanning of the cutting signal.

References Cited in the file of this patent

UNITED STATES PATENTS

| | | |
|---|---|---|
| 2,734,948 | Mueller | Feb. 14, 1956 |
| 2,952,737 | Friess | Sept. 13, 1960 |

OTHER REFERENCES

"Magnetic Video Tape Editing Apparatus," RCA Technical Notes, RCATN20, Aug. 9, 1957.

"Ampex's New Video Tape Recorder," Tele-Tech and Electronics Industries, August 1956.